United States Patent [19]
Berwin

[11] 3,708,716
[45] Jan. 2, 1973

[54] CATHODE RAY BEAM CURRENT CONTROL SYSTEM UTILIZING VARIABLE DUTY CYCLE AND AMPLITUDE MODULATION

[75] Inventor: Ted W. Berwin, Los Angeles, Calif.

[73] Assignee: Hughes Aircraft Company, Culver City, Calif.

[22] Filed: Oct. 6, 1969

[21] Appl. No.: 868,665

[52] U.S. Cl. .................................. 315/30, 315/22
[51] Int. Cl. .................................... H01j 29/52
[58] Field of Search ........................... 315/30, 22

[56] References Cited

UNITED STATES PATENTS

| | | | |
|---|---|---|---|
| 3,525,011 | 8/1970 | Broekma | 315/30 |
| 3,277,335 | 10/1966 | Moser et al. | 315/30 |
| 3,465,200 | 9/1969 | Higbee et al. | 315/30 |
| 3,403,291 | 9/1968 | Lazarchick et al. | 315/30 |

Primary Examiner—Carl D. Quarforth
Assistant Examiner—J. M. Potenza
Attorney—W. H. MacAllister, Jr. and Lawrence V. Link, Jr.

[57] ABSTRACT

The cathode ray beam current in a storage tube, for example, is made accurately controllable over at least a 10,000 to 1 range, despite sweep speed variations and/or different modes of operation, by generating two out of phase pulse trains wherein the pulse duty cycles are made responsive to the modes of operation and/or sweep speed variations. One of the pulse trains is then amplitude modulated by the video. This pulse train is applied to the cathode. The unmodulated pulse train is applied to the control grid of the storage tube. Thereby compensation is provided in the cathode ray beam current for mode and/or sweep speed variations which may otherwise adversely effect the information being displayed and also for enabling an accurate display of the information contained in the video signals.

10 Claims, 3 Drawing Figures

INVENTOR.
TED W. BERWIN,
BY
J.K. Haskell
ATTORNEY.

CATHODE RAY BEAM CURRENT CONTROL SYSTEM UTILIZING VARIABLE DUTY CYCLE AND AMPLITUDE MODULATION

BACKGROUND OF THE INVENTION

This invention relates to means for controlling the beam current of a cathode ray tube to accurately display video information and to compensate for variations in sweep speed and more particularly to improvements therein.

In display systems, such as storage tube displays, it is required to provide control of the cathode ray beam current over a range typically, 10,000 to 1. However, an accurate control of the beam current by presently known techniques, which employ grid to cathode voltage changes, are accurate to 100 to 1 range at best. It is known that in storage tube display applications, it is required to deposit a known charge on a storage surface by means of the controlled electron beam. While the range of beam current control attainable by grid to cathode voltage changes may approach 10,000 to 1, it is not accurate over the full range and also, this can only be obtained in a single mode of operation and for accurate control a knowledge is required of the beam current, $I_b$ versus the grid to cathode voltage $E_{gk}$ curve. This curve is generally a power curve predictable to 100 to 1 beam current range at best. It follows the known equation $I_b = K \cdot E_{gk}^n$ to the end.

The constant $K$ varies greatly from tube to tube, and the exponent $n$ is typically $3 \pm 20$ percent. The difficulties of accurate beam current control by the typical variation of grid to cathode voltage, especially in those systems where several modes of operation must be used, should be appreciated from the foregoing.

OBJECTS AND SUMMARY OF THE INVENTION

An object of this invention is the provision of a system for accurately controlling cathode ray beam current over a range which exceeds 10,000 to 1.

Another object of the invention is the provision of a cathode ray beam current control system which automatically provides accurate beam current control despite differences in modes of operation of the tube.

Still another object of the present invention is the provision of a novel, useful and improved cathode ray beam current control system.

These and other objects of the invention are achieved in an arrangement wherein a mode compensator circuit generates a current whose value is a function of the sweep off and on times for any given mode of operation of the storage tube. This current is applied to a pulse generator which generates phase opposite pulse trains, wherein the duty cycle of the pulses are determined by the input current. One of the phase opposite pulse trains is combined with the usual grid bias and applied to the grid of the storage tube. The other of the phase opposite pulse trains is amplitude modulated by the video and is applied to the cathode of the storage tube. The wide control range accomplished by the present invention is achieved by reducing the grid to cathode control range to about 10 to 1 by amplitude modulating the video potential on pulses whose duty cycle varies up to 2,000,000 to 1. Thus accurate control of the average beam current is effected over a 20,000,000 to 1 range.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
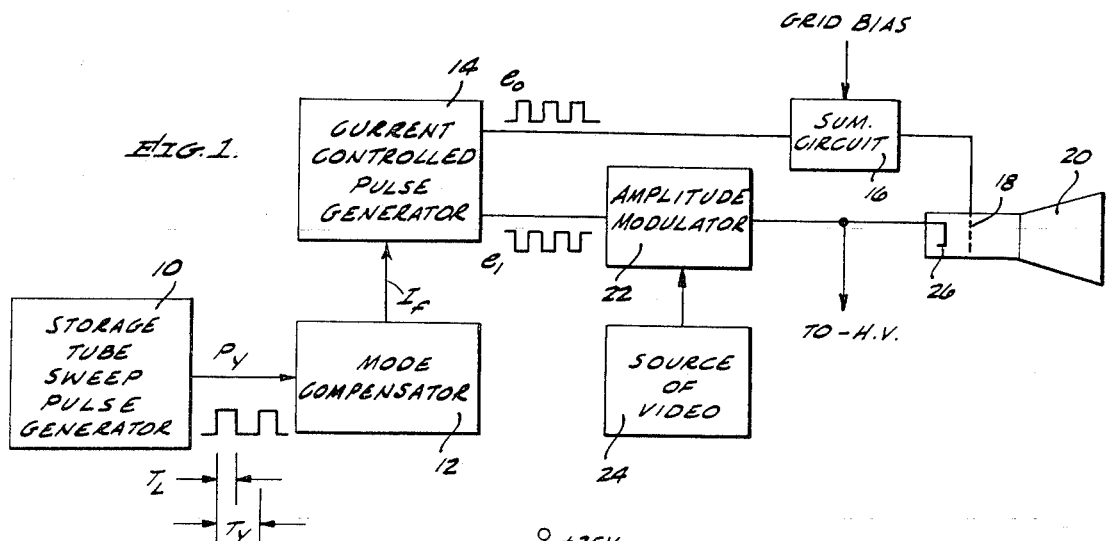
FIG. 1 is a block schematic diagram of an embodiment of the invention.

FIG. 1 is a block schematic diagram of the embodiment of the invention. The sweep pulse generator 10 of a storage tube provides output pulses during sweep time, which are designated as $P_y$. $T_L$ or the pulse width represents the sweep ON time. $P_y$ represents an entire sweep cycle, and therefore the sweep OFF time is the interval $T_y - T_L$. Where it is desired to display radar signals occuring over a 100 mile range, for example, the repetition rate or frequency of the $P_y$ pulse train will be lower than that used when it is desired to display signals occurring over a 10 mile range. The ON time of the sweep or $T_L$ will be greater for the 100 mile range than for the 10 mile range. From the foregoing it will be appreciated that for different modes of operation there will be differences in sweep speeds. Also, with a single mode of operation sweep speeds may be varied. The problem therefore arises on how to accurately reproduce all the gray scales of the various video signals for these different operation modes.

The $P_y$ output of the storage tube sweep pulse generator is applied to a mode compensator circuit 12 which functions to generate a current whose amplitude accurately varies in accordance with a specific function of the repetition rate and on time of the sweep pulse generator. This current is designated as $I_f$.

The output of the mode compensator $I_f$ is applied to a current controlled pulse generator 14. This circuit functions to produce two opposite phase voltage pulse trains respectively $E_0$ and $E_1$. The pulses in these pulse trains have a duty cycle which varies directly with the input current $I_f$. The duty cycle can range over 100,000:1 in response to the variation in the input current amplitude.

The $E_0$ output wave train is combined with the grid bias by a simple summing circuit 16, which can comprise resistors. It is then applied to the control grid 18 of the storage tube 20. The opposite phase pulse train $E_1$ is applied to an amplitude modulator input 22, to be modulated by video signals, which are applied from the source of video 24. The amplitude modulated pulses are then applied to the cathode 26 of the storage tube 20.

In the interval between pulses of the pulse trains the storage tube is cut off. During the interval of the pulses, the cathode ray beam is turned on. For slow sweep speeds the duration of this interval is less than for higher sweep speeds. Accordingly, the number of electrons or the current of the cathode ray beam for a given video signal amplitude, is varied to compensate for different sweep speeds, whereby the brightness level for a given video signal which is displayed is maintained constant despite the different sweep speeds.

The circuitry for the storage tube sweep pulse generator 10 is well known in the art as is the circuitry of the amplitude modulator 22 and the summing circuit 16, and therefore these will not be explained here.

Figure 2:
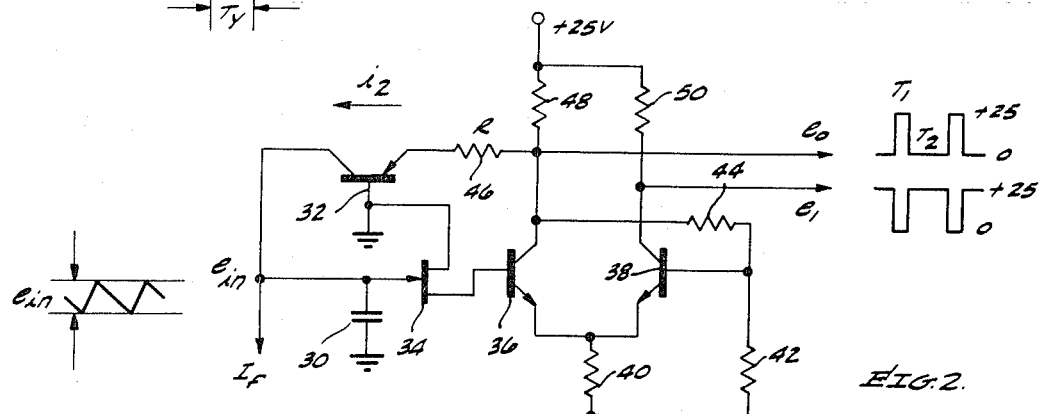
FIG. 2 is a circuit diagram of the current controlled pulse generator which is employed in the embodiment of the invention.

FIG. 2 is a schematic diagram of the current controlled pulse generator. The input current $I_f$ is applied to a capacitor 30. Capacitor 30 is also connected to the collector of a transistor 32. The capacitor 30 has one side grounded and the other side, to which the input current is applied, is connected to the gate electrode of a field effect transistor 34, (hereafter designated as FET 34).

The drain electrode of the FET 34 is connected to the base of transistor 32, which is also grounded. The source electrode of FET 34 is connected to the base of a transistor 36.

The emitter of transistor 36 is connected to the emitter of a transistor 38. These emitters are also connected, through a common load resistor 40, to a −12 volt source. A resistor 42 connects the base of transistor 38 to the −12 volt source.

The base of transistor 38 is connected to the collector of transistor 36 through a resistor 44.

The collector of transistor 36 is connected, through a feedback resistor 46, to the emitter of transistor 32. The collector of transistor 36 is also connected through a resistor 48 to a +25 volt source.

The collector of transistor 38 is connected through a resistor 50 to the +25 volt source.

Opposite phase pulse train outputs are derived from the collector of transistor 36 and from the collector of transistor 38.

The operation of the circuit is as follows. Transistors 36 and 38 are cross connected and biased so that when transistor 36 is in its off or non-conducting state, its collector voltage represented by $e_o$ is substantially at 25 volts, which, by virtue of being applied to the base of transistor 38, turns on that transistor to its full conducting state. As a result, the output, taken from the collector of transistor 38, is substantially 0 volts. When transistor 36 is turned on, its collector output drops to substantially 0 volts, whereby transistor 38 becomes non-conductive and its collector output rises up to substantially +25 volts.

A current $i_2$ is fed back through resistor 46 and transistor 32 to the capacitor 30, which is connected to the control gate of FET 34. The charge on capacitor 30 increases until it attains a level at which it turns on FET 34. When this occurs transistor 36 is turned on whereupon its collector voltage drops essentially to 0. This cuts off the flow of feedback current $i_2$ for the time required to reduce the charge on capacitor 30 below the value required to maintain the FET 34 in its turned on mode. At that time transistor 36 becomes non-conductive whereupon transistor 38 switches to its on or conductive mode.

Effectively an astable circuit is provided which is driven from its stable to its unstable state by the input and returns when the input drops. The pulse trains generated as a result have a duty cycle determined by the input.

The current $I_f$ is provided, then the capacitor 30 serves to integrate both currents. The voltage $e_{in}$ as a result of said integration is a sawtooth voltage which is applied to the gate electrode of FET 34. The average current $i_2 = I_f$ and accordingly the duty cycle of $e_0$ and $e_1$ is proportional to $I_f$.

In an embodiment of the invention which was built, a useful duty cycle range for input currents ranging from 2 milliamperes down to 1 nanoampere was observed, giving a range of from 2,000.000 to 1.

Figure 3:
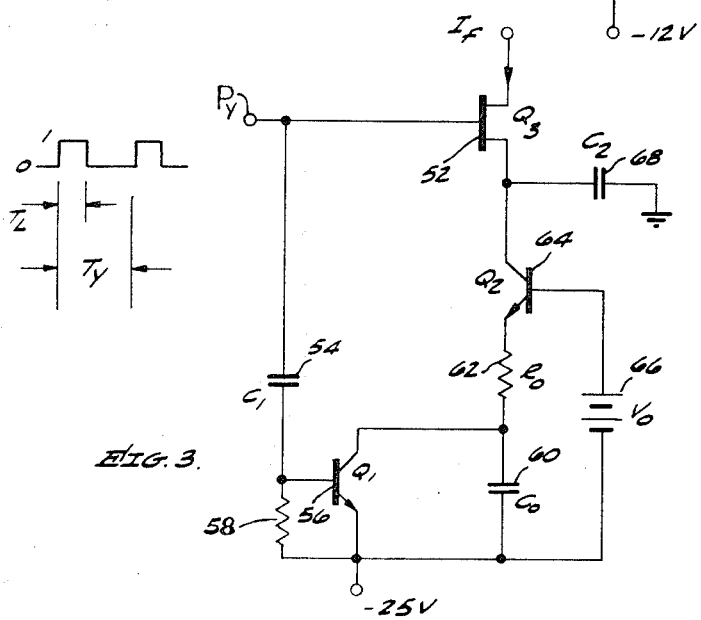
FIG. 3 is a circuit diagram of a mode compensator which is employed with the embodiment of the invention.

FIG. 3 is a circuit diagram of the mode compensator which provides the current $I_f$ to the pulse video modulator. The input unblanking pulses $P_y$ which represent the active sweep time are applied to the gate electrode of a field effect transistor 52 (hereafter referred to as FET 52) and also to a capacitor 54. The capacitor 54 is connected to the base of a transistor 56, and also to a resistor 58. Resistor 58 and the emitter of transistor 56 are connected to a −25 volt source. The collector of transistor 56 is connected through a capacitor 60 to the −25 volt source.

The collector of transistor 56 is also connected through a resistor 62 to the emitter of a transistor 64. A constant voltage source 66, represented by the battery $V_0$, is connected between the base of transistor 64 and the end of capacitor 60 which is connected to the negative potential source.

The collector of transistor 64 is connected to the source electrode of FET 52 and also to a capacitor 68, which is connected to ground. The drain electrode of FET 52 is connected to the input to the current controlled pulse generator shown FIG. 2.

For the purposes of explanation of the operation of the system assume that transistor 56 is maintained conductive whereby it effectively acts as a short. Transistor 64 is maintained conducting at a constant level by virtue of the voltage $V_0$ and a constant current is provided through transistors 64 and 56 to charge up capacitor 68. When FET 52 is turned on by a pulse from the pulse train $P_y$, the charge on capacitor 68 is applied through the FET as output current $I_f$. Transistor 64 acts as a constant current source over the interval when transistor 56 is shorted or fully conductive and the average current coming out of capacitor 68 will be constant. Now it is desired that the total charge on capacitor 68 is to be transferred as $I_f$ only during the times $T_L$ of the pulse train $P_y$. This is what occurs, since FET 52 is turned on only during the interval $T_L$ which is the sweep time. If the sweep time or time $T_L$ is made less, since the charging time of capacitor $C_2$ is determined by the time $T_y - T_L$, then the charge on capacitor 68 is increased. Thus $I_f$ will be higher for faster sweeps and lower for slower sweeps.

In actual operation, capacitor 54 and resistor 58 serve to differentiate the $P_y$ pulses and turn on the transistor 56, or cause it to be fully conductive substantially only during the leading edge of the $P_y$ pulses. Transistor 56 when rendered conductive discharges capacitor 60. Otherwise capacitor 60 charges up over the current path which can be traced from the −25 volt source, resistor 62, transistor 64, capacitor 68 and ground. Capacitor 68 is also charged up except during the interval when it is being discharged, while FET 52 is turned on. Thus over the interval $T_L$, FET 52 is gated on to discharge capacitor 68. At the beginning of the interval $T_L$ transistor 56 is gated on discharging capacitor 60. Capacitor 68 charges up over the interval $(T_L - T_y)$.

From the foregoing, the following conclusions can be drawn. For any given mode of operation, capacitor 68 will receive a charge and deliver a current which is inversely proportional to the time $T_L$, since the shorter the $T_L$ time, the longer the charge time and therefore the higher the current $I_f$ which can be delivered during $T_L$ time when FET 52 is enabled. This is a proper operation since the narrower the $P_u$ pulse, the greater the sweep speed for a given mode and the greater the charge for a given interval which is required.

For those operational modes in which there are overlapping fields this circuit provides proper operation. As the $P_u$ repetition rate increases, $I_f$ will decrease. This too is a desirable mode of operation since less charge is needed with the increased sweep repetition frequency. Over a given interval of time there are more charge increments added to a given region of the storage tube target and thus less charge per given increment is needed for each sweep.

There has accordingly been described and shown herein a novel and useful beam current control system for a cathode ray tube device which automatically delivers the proper beam current for different modes of operation and over a wide range of operation.

What is claimed is:

1. A system for controlling the current in the electron beam of a cathode ray tube having a cathode and a control grid as a function of video signals and the sweep speed of the electron beam, said system comprising:

means for generating a current which is a function of sweep speed;

pulse generator means responsive to said current for generating a first train of pulses and a second train of pulses of opposite phase from said first train of pulses, and wherein the duty cycle of the pulses in said first and second pulse trains vary as to function of said current;

means for amplitude modulating said first train of pulses with said video signals;

means for applying said first amplitude modulated pulse train to the cathode of said cathode ray tube; and means for applying said second pulse train to said cathode ray tube grid.

2. A system as recited in claim 1 wherein said pulse generator means comprises:

a circuit having a stable state and an unstable state, having a first output and a second output for respectively producing said first and second pulse trains, and having an input for driving said circuit from its stable to its unstable state;

means for applying a signal to said input for driving said circuit from its stable to its unstable state comprising:

a capacitor connected to said input circuit, means for applying a feedback current from said first output to said capacitor, means for applying said current to said capacitor, and means responsive to the voltage on said capacitor exceeding a predetermined threshold for driving said circuit from its stable to its unstable state.

3. A system as recited in claim 1 wherein said pulse generator means comprises:

a circuit having a stable state and an unstable state, having a first output and a second output for respectively producing said first and second pulse trains, and having an input for driving said circuit from its stable to its unstable state;

means for applying a signal to said input for driving said circuit from its stable to its unstable state comprising:

a field effect transistor having gate, source and drain electrodes, means connecting said field effect transistor gate electrode to the input of said circuit, a first transistor having collector, base and emitter electrodes, means connecting said base electrode to said field effect transistor drain electrode, a feedback resistor connected between the first output of said circuit and the emitter of said first transistor, means connecting said first transistor collector to said field effect transistor gate, a capacitor connected between said field effect transistor gate and said first transistor base, and means for applying said current to said capacitor.

4. A system as recited in claim 3 wherein said circuit comprises:

a second and third transistor each having base collector and emitter electrodes, first resistor means coupling said second transistor collector to said third transistor base, means connecting together the emitters of said second and third transistors, means connecting said field effect transistor source to said second transistor base, feedback resistor means connected between said first transistor emitter and said second transistor collector, means for applying operating potentials to the collectors and emitters of said second and third transistors, and means for applying a biasing potential to said third transistor base.

5. A system as recited in claim 1 wherein said means for generating a current which is a function of sweep speed comprises:

a source of an unblanking pulse train wherein pulses in said unblanking pulse train constitute cathode ray tube unblanking signals, a capacitor, a source of potential, means for charging said capacitor from said source of potential, and means for discharging said capacitor during each pulse in said unblanking pulse train to provide a current which is a function of sweep speed.

6. A system as recited in claim 5 wherein said means for charging said capacitor from said source of potential comprises:

a transistor having collector, base and emitter electrodes, means for applying a conductive bias to said transistor base, means connecting said transistor collector to said capacitor, a resistor having one end connected to said transistor emitter, another capacitor connected between said source of potential and the other end of said resistor, means for discharging said another capacitor responsive to the leading edge of an unblanking pulse in said train, and field effect transistor means connected to said capacitor for discharging said capacitor responsive to an unblanking pulse in said pulse train.

7. A method for accurately controlling the current in the electron beam of a cathode ray tube as a function of video signals and the electron beam sweep speed, said method comprising:

generating a current as function of sweep speed;

generating a first train of pulses, and a second train of pulses;

varying the duty cycle of said first train of pulses and said second train of pulses as a function of said current;

amplitude modulating said first train of pulses as a function of said video signals; and applying said amplitude modulated first train of pulses and said second train of pulses to said cathode ray tube for controlling its electron beam.

8. In a cathode ray beam storage tube system wherein the cathode ray beam is modulated as a function of video signals and a control current, the improvement comprising:

pulse generator means for generating a train of pulses whose duty factor is a function of said control current, means for amplitude modulating the pulses in said train of pulses as a function of said video signals, and means for applying said amplitude modulated train of pulses to said storage tube for modulating the cathode ray beam in response thereto.

9. In a cathode ray beam storage tube system as recited in claim 8 wherein there is included a source of unblanking pulses for unblanking the cathode ray beam of said storage tube, and said pulse generator means includes means for generating said control current as a function of the unblanking pulse interval and frequency.

10. A cathode ray tube control system for controlling the beam current of a cathode ray tube as a function of first and second signals, said system comprising:

means for producing a series of pulses whose duty factor is a function of said first signal;

means for amplitude modulating said series of pulses as a function of said second signal; and means for applying said amplitude modulated series of pulses to said cathode ray tube so that its beam current is controlled in response thereto.

* * * * *